United States Patent
Wan (10) Patent No.: US 11,249,771 B2
(45) Date of Patent: Feb. 15, 2022

(54) TERMINAL INPUT INVOCATION

(71) Applicant: Huawei Technologies Co., Ltd., Shenzhen (CN)

(72) Inventor: Qingbo Wan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 104 days.

(21) Appl. No.: 16/690,348

(22) Filed: Nov. 21, 2019

(65) Prior Publication Data

US 2020/0089512 A1    Mar. 19, 2020

Related U.S. Application Data

(63) Continuation of application No. PCT/CN2018/093152, filed on Jun. 27, 2018.

(51) Int. Cl.
  *G06F 9/451* (2018.01)
  *G06F 3/14* (2006.01)
  *H04L 29/06* (2006.01)

(52) U.S. Cl.
  CPC ............. *G06F 9/452* (2018.02); *G06F 3/14* (2013.01); *H04L 67/38* (2013.01); *H04L 67/42* (2013.01)

(58) Field of Classification Search
  CPC .................................. G06F 9/452; G06F 3/14
  See application file for complete search history.

(56) References Cited

U.S. PATENT DOCUMENTS

| | | | |
|---|---|---|---|
| 2009/0282359 A1* | 11/2009 | Saul | G06F 9/452 715/784 |
| 2010/0268828 A1 | 10/2010 | Pahlavan et al. | |
| 2011/0246904 A1 | 10/2011 | Pinto et al. | |
| 2012/0236018 A1* | 9/2012 | Kwon | G06F 3/04886 345/589 |
| 2012/0243045 A1* | 9/2012 | Sato | G06F 3/1292 358/1.15 |
| 2012/0324365 A1* | 12/2012 | Momchilov | H04L 67/42 715/738 |

(Continued)

FOREIGN PATENT DOCUMENTS

| | | |
|---|---|---|
| CN | 102427448 A | 4/2012 |
| CN | 102521027 A | 6/2012 |

(Continued)

OTHER PUBLICATIONS

Machine Translation and Abstract of Chinese Publication No. CN102427448, Apr. 25, 2012, 16 pages.

(Continued)

*Primary Examiner* — Kevin T Bates
*Assistant Examiner* — Chen-Liang Huang
(74) *Attorney, Agent, or Firm* — Conley Rose, P.C.

(57) ABSTRACT

In a method for invoking an input method, when an application on the server enters an editing state, a desktop serving end in the server monitors an operating system to determine that the application is in the editing state, and then the desktop serving end sends, to the terminal, a message indicating that the application is in the editing state, where the message triggers the terminal to invoke an input method of the terminal. In this way, when the application is in the editing state, a user may enter a text by using the input method of the terminal.

21 Claims, 6 Drawing Sheets

(56) References Cited

U.S. PATENT DOCUMENTS

| | | | |
|---|---|---|---|
| 2014/0053076 A1* | 2/2014 | Tang | G06F 16/9554 |
| | | | 715/740 |
| 2016/0246560 A1* | 8/2016 | Petrov | G06F 9/452 |
| 2017/0255169 A1* | 9/2017 | Lee | G06F 3/0482 |

FOREIGN PATENT DOCUMENTS

| | | | |
|---|---|---|---|
| CN | 103838375 | A | 6/2014 |
| CN | 104317414 | A | 1/2015 |
| CN | 105282092 | A | 1/2016 |
| CN | 106325840 | A | 1/2017 |
| CN | 106802762 | A | 6/2017 |
| WO | 2017091411 | A1 | 6/2017 |

OTHER PUBLICATIONS

Machine Translation and Abstract of Chinese Publication No. CN102521027, Jun. 27, 2012, 7 pages.
Machine Translation and Abstract of Chinese Publication No. CN103838375, Jun. 4, 2014, 13 pages.
Machine Translation and Abstract of Chinese Publication No. CN104317414, Jan. 28, 2015, 12 pages.
Machine Translation and Abstract of Chinese Publication No. CN105282092, Jan. 27, 2016, 14 pages.
Machine Translation and Abstract of Chinese Publication No. CN106325840, Jan. 11, 2017, 22 pages.

\* cited by examiner

TERMINAL INPUT INVOCATION

CROSS-REFERENCE TO RELATED APPLICATIONS

This is a continuation of Int'l Patent App. No. PCT/CN2018/093152 filed on Jun. 27, 2018, which is incorporated by reference.

TECHNICAL FIELD

This application relates to the computer field, and in particular, to a method and an apparatus for invoking an input method, a server, a terminal, and a computer program product.

BACKGROUND

A server may provide a picture of a virtual desktop for a terminal. For example, the server may run, on a container or a virtual machine (VM), a program that provides the virtual desktop. For example, the server may directly provide a desktop of the server for the terminal. For ease of description, the desktop is also referred to as a virtual desktop in this application. The terminal displays the virtual desktop on a touchscreen of the terminal.

When it is displayed on the virtual desktop that an application enters an editing state, a user can learn, from the touchscreen of the terminal only by using eyes, that the application is in the editing state. In this way, when the application is in the editing state, the user can enter a text only by manually invoking a virtual keyboard of the terminal.

SUMMARY

In view of this, this application provides a method and an apparatus for invoking an input method, a server, a terminal, and a computer program product, so that invoking of an input method of a terminal can be triggered by a condition that an application on a server enters an editing state.

According to a first aspect, this application provides a method for invoking an input method. The method is performed by a desktop serving end deployed on a server.

In the method, the server provides a virtual desktop for a terminal by using the desktop serving end, and the terminal displays the virtual desktop. The virtual desktop displays an application that is on the server. When the application enters an editing state, the desktop serving end instructs the terminal to enable an input method of the terminal. In this way, a user may enter a text in this application by using the input method of the terminal.

In a possible design of the first aspect, when the application on the server enters the editing state, the application invokes an interface of an operating system (OS). In this design, the desktop serving end monitors the interface. If it is detected that the application invokes the interface, it is determined that the application is in the editing state. Then, the desktop serving end sends, to the terminal, a message indicating that the application is in the editing state, where the message triggers the terminal to invoke the input method of the terminal.

In a possible design of the first aspect, when the terminal receives the message that is sent by the desktop serving end and that indicates that the application is in the editing state, the terminal queries a configuration file to determine whether to enable the input method. In this way, when the application enters the editing state, the terminal has the option, and may choose, based on the configuration file, whether to enable the input method.

In a possible design of the first aspect, when the terminal receives the message that is sent by the desktop serving end and that indicates that the application is in the editing state, the terminal determines, based on the user's choice, whether to enable the input method. In this way, when the application enters the editing state, the user may choose whether to enable the input method of the terminal.

In a possible design of the first aspect, the desktop serving end obtains coordinates, on the virtual desktop, of a cursor existing when the application is in the editing state, and the terminal sends the coordinates. On a display (for example, a touchscreen) of the terminal, if the coordinates are within a display area of the input method of the terminal, the terminal moves a display area of the virtual desktop, so that the coordinates and the display area of the virtual desktop are outside the display area of the input method of the terminal. In this way, both the cursor and the input method may be displayed on the display of the terminal.

Optionally, the input method may be displayed at a location of the cursor.

Optionally, the input method may be displayed in a bottom area of the display, and the input method does not block the cursor.

In a possible design of the first aspect, if there is an overlapping area between the display area of the input method of the terminal and the display area of the virtual desktop on the display of the terminal, the terminal displays the input method of the terminal in the overlapping area.

In a possible design of the first aspect, if the virtual desktop is not in the editing state of the application, the desktop serving end instructs the terminal to disable the input method of the terminal. In this way, the user cannot continue to use the input method of the terminal to enter a text in the application.

Optionally, the desktop serving end monitors whether the operating system exits the editing state of the application, in other words, determines whether the virtual desktop is not in the editing state of the application; and when the virtual desktop is not in the editing state of the application, the desktop serving end sends, to the terminal, a message indicating that the virtual desktop is not in the editing state of the application, and the message instructs the terminal to disable the input method of the terminal.

According to a second aspect, this application provides an apparatus for invoking an input method, and functional modules included in the apparatus are configured to implement the steps performed by the desktop serving end in the method provided in any one of the first aspect or the possible designs of the first aspect.

This application provides another apparatus for invoking an input method, and functional modules included in the apparatus are configured to implement the steps performed by the terminal in the method provided in any one of the first aspect or the possible designs of the first aspect.

According to a third aspect, this application provides a server. The server includes a processor and a memory. The memory stores a computer instruction, and the processor executes the computer instruction stored in the memory, so that the server performs the steps performed by the desktop serving end in the method provided in any one of the first aspect or the possible designs of the first aspect.

This application provides a terminal. The terminal includes a display, a processor, and a memory. The memory stores a computer instruction, and the processor executes the computer instruction stored in the memory, so that the terminal performs the steps performed by the terminal in the method provided in any one of the first aspect or the possible designs of the first aspect.

According to a fourth aspect, this application provides a computer readable storage medium. The computer readable storage medium stores a computer instruction. When a processor in a server executes the computer instruction, the server performs the steps performed by the desktop serving end in the method provided in any one of the first aspect or the possible designs of the first aspect.

This application provides a computer readable storage medium. The computer readable storage medium stores a computer instruction. When a processor in a terminal executes the computer instruction, the terminal performs the steps performed by the terminal in the method provided in any one of the first aspect or the possible designs of the first aspect.

This application provides a computer program product. The computer program product includes a computer instruction. The computer instruction is stored in a computer readable storage medium. A processor in a server may read the computer instruction from the computer readable storage medium, and the processor executes the computer instruction, so that the server performs the steps performed by the desktop serving end in the method provided in any one of the first aspect or the possible designs of the first aspect.

This application provides a computer program product. The computer program product includes a computer instruction. The computer instruction is stored in a computer readable storage medium. A processor in a terminal may read the computer instruction from the computer readable storage medium, and the processor executes the computer instruction, so that the terminal performs the steps performed by the terminal in the method provided in any one of the first aspect or the possible designs of the first aspect.

DESCRIPTION OF EMBODIMENTS

The following describes technical solutions provided in this application with reference to the accompanying drawings in this application.

Application Scenario

Figure 1:
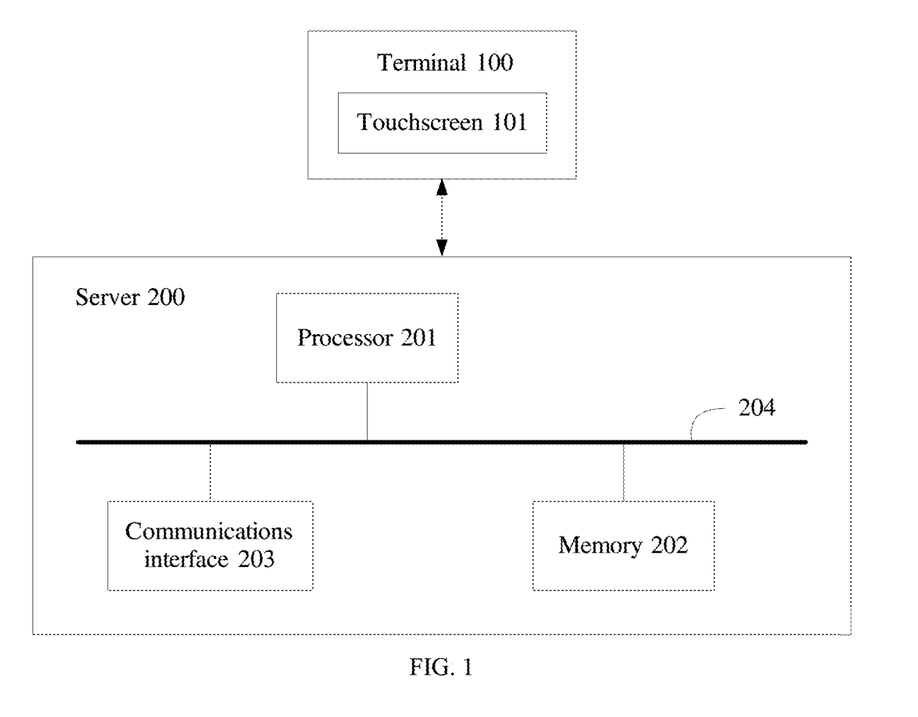
FIG. 1 is a schematic diagram of an architecture in an application scenario to which this application is applied.

Referring to FIG. 1, a server 200 is communicatively connected to a terminal 100.

An input method with an editing capability is deployed on the terminal 100. The input method supports input from a terminal without a keyboard. Optionally, a virtual keyboard may be provided for the input method. Optionally, the input method may support an editing manner of handwriting input. Optionally, the input method may support an editing manner of voice input.

The terminal 100 may not have a physical keyboard. For example, the terminal 100 includes a touchscreen 101, and a user may use, by operating the touchscreen 101, the editing capability provided by the input method. For example, the user may tap, on the touchscreen 101, the virtual keyboard provided by the input method, to enter a tapped character. For another example, the terminal 100 includes a voice obtaining device (for example, a microphone). The voice obtaining device may obtain a voice of a user, and if a voice input function of the input method is enabled, the obtained voice is used as input of the input method.

Optionally, the terminal 100 may be a mobile terminal such as a smartphone, a tablet computer, a wearable device, or a vehicle-mounted computer.

The server 200 may provide a virtual desktop for the terminal 100. Correspondingly, the terminal 100 displays the virtual desktop on the touchscreen 101. In this way, a user may browse an application displayed on the virtual desktop, and may use, by using the terminal 100, the application displayed on the virtual desktop provided by the server 200, for example, a text editing application. Specifically, the server 200 runs a desktop serving end, and the terminal 100 runs a desktop client. The desktop serving end is communicatively connected to the desktop client. The desktop serving end generates a picture of the virtual desktop, and sends the picture of the virtual desktop to the desktop client. In this way, the terminal 100 may display the picture of the virtual desktop.

Optionally, the server 200 runs software that provides the virtual desktop. For example, a container is deployed on the server 200, and the container runs the software to generate the virtual desktop. The container runs the desktop serving end, and the desktop serving end may capture the picture of the virtual desktop.

Optionally, the server 200 runs a VM, and an operating system of the VM generates the virtual desktop. The operating system of the VM runs the desktop serving end, and the desktop serving end may capture the picture of the virtual desktop, and send the picture of the virtual desktop to the desktop client of the terminal 100.

Optionally, the server 200 is a server in a cloud, and the cloud may be a public cloud, a private cloud, or a hybrid cloud. For example, the cloud includes a plurality of servers. A server that provides the virtual desktop in the cloud may be shown as the server 200 in FIG. 1. Optionally, the plurality of servers in the cloud are virtualized through cloud computing, and provide virtualized resources such as a computing resource, a storage resource, and an input/output (I/O) resource, so that the virtualized resources may be used to deploy the VM that provides the virtual desktop.

Optionally, a possible basic hardware architecture of the server 200 is shown in FIG. 1.

Referring to FIG. 1, the server 200 includes a processor 201, a memory 202, a communications interface 203, and a bus 204.

In the server 200, there may be one or more processors 201. FIG. 1 only shows one processor 201. Optionally, the processor 201 may be a central processing unit (CPU). If the server 200 includes a plurality of processors 201, the plurality of processors 201 may be of different types or a same type. Optionally, the plurality of processors 201 in the server 200 may be integrated into a multi-core processor.

The memory 202 stores a computer instruction and data. For example, the memory 202 stores a computer instruction and data for providing the virtual desktop, and stores a computer instruction and data for implementing a method for invoking an input method provided in this application. The memory 202 may be any one or any combination of the following storage media: a nonvolatile memory (for example, a read-only memory (ROM), a solid-state drive (SSD), a hard disk (HDD), or a compact disc) and a volatile memory.

The communications interface 203 may be any one or any combination of the following components with a network access function: a network interface (for example, an Ethernet interface) and a wireless network interface card.

The communications interface 203 is used by the server 200 to perform data communication with another device (for example, a terminal).

A thick line is used to represent the bus 204 in FIG. 1. The bus 204 may connect the processor 201 to the memory 202 and the communications interface 203. In this way, the processor 201 may access the memory 202 by using the bus 204, and may further exchange data with another device (for example, a terminal) by using the communications interface 203.

In this application, the server 200 executes the computer instruction in the memory 202, so that the server 200 implements the method for invoking an input method provided in this application.

This method may be applied to the foregoing application scenario. A server provides a virtual desktop for a terminal, and the terminal displays the virtual desktop on a display (for example, the touchscreen 101). The server may provide the virtual desktop in a plurality of implementations. In the following example, two implementations are provided, and how to detect that the application enters an editing state is described with reference to the two implementations.

In a first implementation, the server runs an OS, and directly runs a program that provides the virtual desktop, a program of an input method, a program of a desktop serving end, a program of another application, and the like on the OS. If the application (for example, Microsoft Word) on the server is being used by a user, the OS displays a window of the application on the virtual desktop. When the application enters the editing state, the application invokes an interface that is provided by the OS and that is used to set a cursor. Optionally, the application may alternatively invoke an interface of the input method by using the OS. In this application, the desktop serving end is configured to detect that the application invokes the interface that is provided by the OS and that is used to set a cursor, or the desktop serving end may be configured to detect that the OS invokes the interface of the input method. If it is detected that the application invokes the interface that is provided by the OS and that is used to set a cursor, or it is detected that the application invokes the interface of the input method by using the OS, it is determined that the application enters the editing state.

In a second implementation, a VM is deployed on the server. The VM runs an OS, and runs a program that provides the virtual desktop, a program of an input method, a program of a desktop serving end, a program of an application, and the like on the OS. If the application on the VM is being used by a user, the OS displays a window of the application on the virtual desktop. When the application enters the editing state, the application invokes an interface that is provided by the OS and that is used to set a cursor. Optionally, the application may alternatively invoke an interface of the input method by using the OS. In this application, the desktop serving end is configured to detect that the application invokes the interface that is provided by the OS and that is used to set a cursor, or the desktop serving end may be configured to detect that the OS invokes the interface of the input method. If it is detected that the application invokes the interface that is provided by the OS and that is used to set a cursor, or it is detected that the application invokes the interface of the input method by using the OS, it is determined that the application enters the editing state.

Optionally, the interface that is provided by the OS and that is used to set a cursor is SetCaretPos( ). The interface SetCaretPos( ) may be used to set an input position of a current cursor, and may be further used to set the cursor to be in an editing state.

Optionally, the input method provides an interface ImmGetContext( ), and the interface ImmGetContext( ) may obtain a configuration parameter of the input method. If the application invokes, by using the OS, the interface ImmGetContext( ) provided by the input method, the OS may obtain an environment configuration parameter of the input method, and the OS may configure a runtime environment of the input method based on the configuration parameter.

An implementation procedure in which the application invokes the input method by using the OS is as follows: When the application enters the editing state, the OS sends a WM_IME_SETCONTEXT message to the application. Correspondingly, the application instructs the OS to invoke the interface ImmGetContext( ), to obtain the environment configuration parameter of the input method. If the desktop serving end detects that the OS invokes the interface ImmGetContext( ), it is determined that the application enters the editing state.

Optionally, the input method provides an interface ImmNotifyIME( ). In a process of performing editing by using the input method, the input method provides a plurality of content options. A position of a cursor in a window of the input method may be changed by using the interface ImmNotifyIME( ), and input content for user selection is provided at a location of the cursor.

In this application, a server provides a virtual desktop in a plurality of implementations. The following describes this method in an implementation in which a VM in the server provides the virtual desktop, and this method is performed by the VM in the server. It may be understood that this method is still applicable in another implementation in which the server provides the virtual desktop, and an execution body of this method may change. For example, in an implementation in which the server directly provides the virtual desktop, the execution body is the server.

In a scenario in which a VM in a server provides a virtual desktop for a terminal, in this method, when an application running on the VM enters an editing state, an input method of the terminal is enabled on the terminal. In this way, when the application is in the editing state, editing (for example, text editing) may be performed by using the input method of the terminal.

Figure 2:
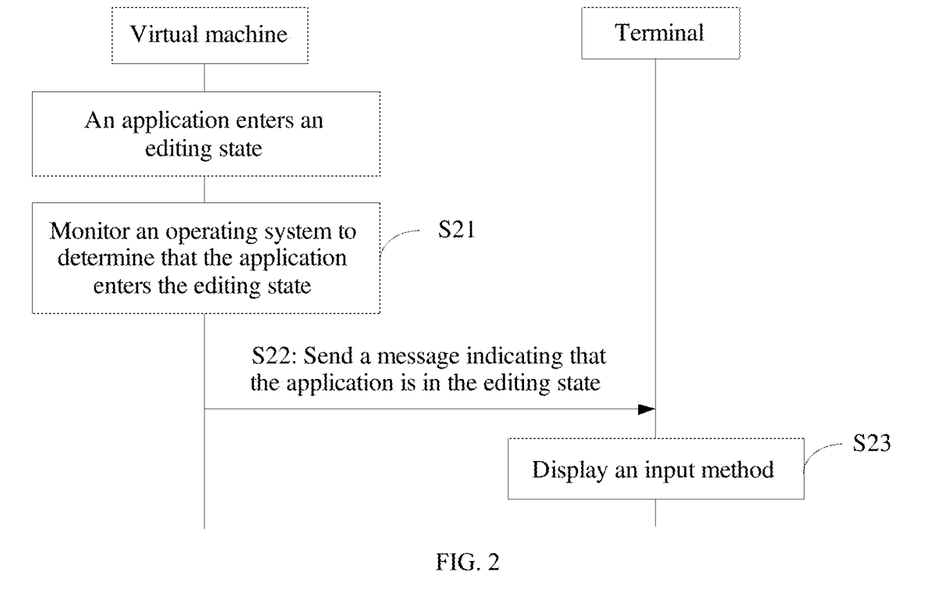
FIG. 2 is a schematic flowchart of a method for invoking an input method according to this application.

FIG. 2 shows a procedure of this method, and the procedure includes step S21, step S22, and step S23.

Step S21: A VM monitors an operating system of the VM to determine that an application enters an editing state.

When the application on the VM is being used by a user, the OS of the VM displays a window of the application on a virtual desktop. Correspondingly, a terminal displays, on a display (for example, a touchscreen), the virtual desktop that includes the window of the application. When the application enters the editing state, the application invokes the OS to set a cursor, and a desktop serving end in the VM detects that the application invokes an interface that is provided by the OS and that is used to set a cursor. If it is detected that the application invokes the interface, the VM determines that the application enters the editing state. Optionally, when the application enters the editing state, the application may alternatively invoke an input method by using the OS, and a desktop serving end in the VM detects that the application invokes an interface of the input method by using the OS. If it is detected that the OS invokes the interface, the VM determines that the application enters the editing state.

Step S22: The VM sends, to the terminal, a message indicating that the application is in the editing state.

When the application on the VM enters the editing state, the application is in the editing state. When the application is in the editing state, the VM sends the message to the terminal, and the message indicates that the application is in the editing state.

Step S23: The terminal enables the input method of the terminal.

The terminal receives the message that is sent by the VM to the terminal in step S22, and determines, based on the message, that the application on the VM is in the editing state. When determining that the application is in the editing state, the terminal may enable the input method of the terminal, and display the input method on the display of the terminal.

Optionally, because the terminal displays both the input method and the virtual desktop on the display, a display area of the input method may overlap a display area of the virtual desktop. If the display area of the input method overlaps the display area of the virtual desktop, only the input method is displayed in an overlapping area; to be specific, the input method is displayed in the overlapping area on the virtual desktop. In a part, on the display (for example, the touchscreen), in which the display area of the input method does not overlap the display area of the virtual desktop, a window of the input method and the virtual desktop are separately displayed on the display.

After the terminal displays the input method of the terminal on the display, the user may perform text input by using the input method. The terminal sends content of the text input to the VM, and the VM enters the content of the text input when the application is in the editing state. The VM performs updating and displays the content of the text input on the virtual desktop, and sends the updated virtual desktop to the terminal. The terminal synchronously displays the content of the text input on the virtual desktop. In this way, the user observes, on the virtual desktop, an editing effect existing when the application is in the editing state.

In this application, the text input may include any one of the following operations provided by the input method: entering a text, deleting a text, or another operation performed on a text. The text may be a word, a symbol, or a character provided by the input method.

Optionally, an input method of the VM may be the same as or different from the input method of the terminal. For example, the VM provides a Microsoft input method, and the terminal provides an input method of handwriting input.

Optionally, in step S22, when the application on the VM is in the editing state, the VM records current coordinates of the cursor on the virtual desktop, and sends the coordinates to the terminal. On the display of the terminal, if the coordinates are within the display area of the input method of the terminal, the terminal moves a location of the display area of the virtual desktop on the display, so that the coordinates and the display area of the virtual desktop are outside the display area of the input method of the terminal. In this way, the terminal may display both the coordinates on the virtual desktop and the input method. Optionally, the terminal displays the input method in a bottom area of the display, or the terminal may display the input method at the coordinates on the virtual desktop.

When text input is subsequently performed by using the input method of the terminal, the VM starts to enter content of the text input from the current coordinates of the cursor, and updates the current coordinates of the cursor. It can be learned that the content of the text input and updated current coordinates are updated and displayed on the virtual desktop. Correspondingly, when the terminal displays the virtual desktop sent by the VM, the content of the text input and the updated current coordinates are displayed on the virtual desktop.

Optionally, when receiving the message that is sent by the VM in step S22, and determining, based on the message, that the application on the VM is in the editing state, the terminal queries a configuration file to determine whether to perform step S23 of enabling the input method of the terminal. The configuration file may record either of the following two options: an option 1 in which the terminal does not enable the input method of the terminal even if the application on the VM is in the editing state; and an option 2 in which when the application on the VM is in the editing state, the terminal enables the input method, and displays the input method on the display.

Optionally, when receiving the message that is sent by the VM in step S22, and determining, based on the message, that the application on the VM is in the editing state, the terminal instructs the user to choose whether to perform step S23 of enabling the input method of the terminal, and determines, based on a choosing result of the user, whether to perform step S23.

A manner of triggering an application on a VM to enter an editing state is not limited in this application. In the following example, a triggering manner is provided, and the triggering manner is implemented by using a procedure shown in FIG. 3. The procedure shown in FIG. 3 includes step S31, step S32, step S33, and step S34.

Figure 3:
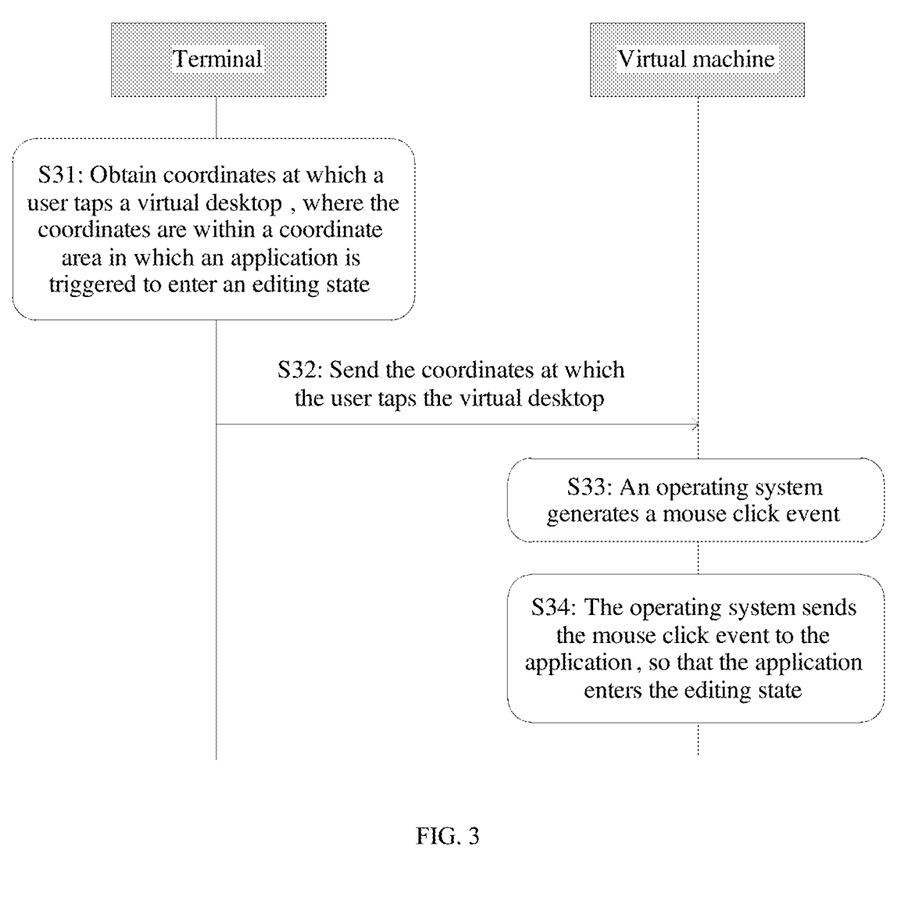
FIG. 3 is a schematic flowchart of triggering an application to enter an editing state.

Step S31: A terminal obtains coordinates at which a user taps a virtual desktop.

The user operates a touchscreen of the terminal, and taps, on the virtual desktop, a coordinate area in which an application is triggered to enter an editing state. For example, when the application is not in the editing state, the user taps, on the virtual desktop, a control that triggers the application to enter the editing state. An area occupied by the control on the virtual desktop may be the coordinate area in which the application is triggered to enter the editing state. For another example, when the application is already in the editing state, if switching is performed from a window that is not in an editing state to a window of the application, and the editing window of the application is tapped on the virtual desktop, an area occupied by the editing window on the virtual desktop may be the coordinate area in which the application is triggered to enter the editing state.

In this way, the terminal may obtain the coordinates at which the user taps the virtual desktop. The coordinates are coordinates in a coordinate system of the virtual desktop, and the coordinates are within the coordinate area in which the application is triggered to enter the editing state.

Step S32: The terminal sends the coordinates at which the user taps the virtual desktop to a VM.

Step S33: When the VM receives the coordinates sent by the terminal, an OS of the VM generates a mouse click event, where the mouse click event records the coordinates.

Optionally, when the user taps the virtual desktop, the terminal generates a tap event, and the tap event includes the coordinates at which the user taps the virtual desktop. In step S32, the terminal sends the tap event to the VM. Correspondingly, in step S33, the VM converts the tap event into the mouse click event.

Step S34: The OS of the VM sends the mouse click event to the application, where the coordinates recorded in the mouse click event trigger the application to enter the editing state.

In a scenario in which a VM in a server provides a virtual desktop for a terminal, in this method, when the VM exits an editing state of an application, an input method of the terminal is disabled on the terminal. In this way, editing (for example, text editing) in the application by using the input method of the terminal may be stopped.

Figure 4:
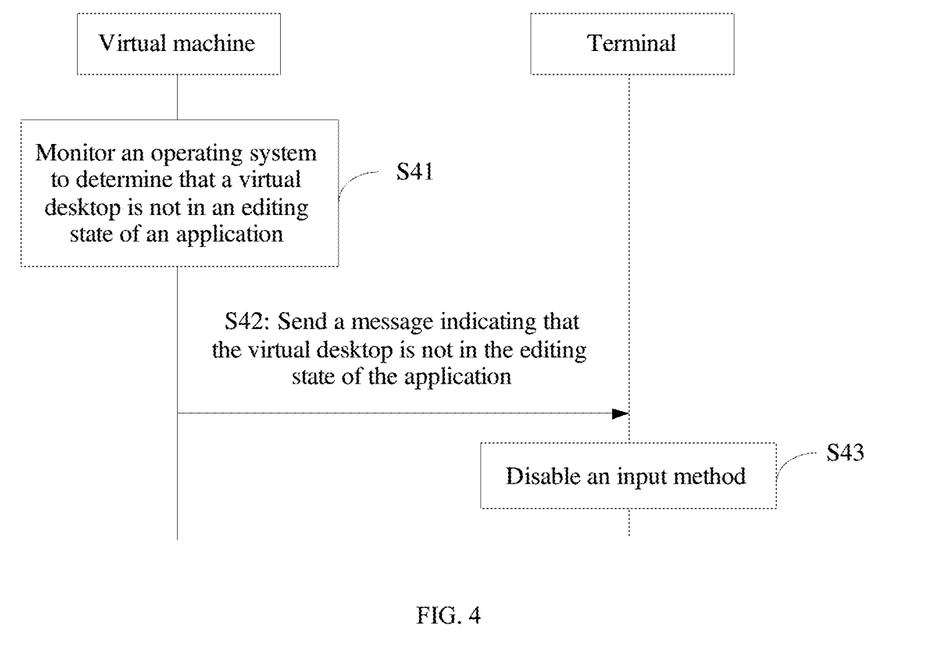
FIG. 4 is a schematic flowchart of a method for invoking an input method according to this application.

FIG. 4 shows a procedure of this method. The procedure includes step S41, step S42, and step S43.

Step S41: A VM monitors an OS of the VM to determine that a virtual desktop is not in an editing state of an application.

After the application on the VM enters the editing state, the OS of the VM may exit the editing state of the application, so that the virtual desktop is not in the editing state of the application. A desktop serving end in the VM is configured to detect that the virtual desktop is not in the editing state of the application.

For example, if the OS switches from a window of the application to another application that is not in an editing state, the OS invokes an interface used to hide the window of the application, and the desktop serving end in the VM may detect that the OS invokes the interface. If it is detected that the OS invokes the interface, it is determined that the virtual desktop is not in the editing state of the application.

For example, when exiting the editing state of the application, the OS invokes an interface used to disable the input method. The desktop serving end in the VM may detect that the interface is invoked. If it is detected that the interface is invoked, it is determined that the virtual desktop is not in the editing state of the application.

Step S42: The VM sends, to a terminal, a message indicating that the virtual desktop is not in the editing state of the application.

After the OS of the VM exits the editing state of the application, the virtual desktop is not in the editing state of the application. When the virtual desktop is not in the editing state of the application, the VM sends the message to the terminal, where the message records that the virtual desktop is not in the editing state of the application.

Step S43: The terminal disables the input method of the terminal.

The terminal receives the message that is sent by the VM to the terminal in step S42, and determines, based on the message, that the virtual desktop is not in the editing state of the application. When determining that the virtual desktop is not in the editing state of the application, the terminal may disable the input method of the terminal, and does not display the input method on a display (for example, a touchscreen) of the terminal. In this way, a user cannot enter a text by using the input method of the terminal, so that editing by the user in the application by using the input method of the terminal is stopped.

Optionally, in step S42, when the virtual desktop is not in the editing state of the application, the VM records current coordinates of a cursor on the virtual desktop, and sends the coordinates to the terminal. When displaying the virtual desktop, the terminal stops displaying the input method of the terminal at the coordinates. In this way, the terminal does not display the input method of the terminal on the virtual desktop.

Optionally, when receiving the message that is sent by the VM in step S42, and determining, based on the message, that the virtual desktop is not in the editing state of the application, the terminal queries a configuration file to determine whether to perform step S43 of disabling the input method on the virtual desktop. The configuration file may record either of the following two options: an option 1 in which the terminal still displays the input method of the terminal on the display even if the virtual desktop is not in the editing state of the application; and an option 2 in which the terminal disables the input method of the terminal when the virtual desktop is not in the editing state of the application. In this way, if the configuration file records the option 1, the terminal does not disable the input method on the display based on the configuration file; or if the configuration file records the option 2, the terminal performs, based on the configuration file, step S43 of disabling the input method.

Optionally, when receiving the message that is sent by the VM in step S42, and determining, based on the message, that the virtual desktop is not in the editing state of the application, the terminal instructs the user to choose whether to perform step S43 of disabling the input method of the terminal, and determines, based on a choosing result of the user, whether to perform step S43.

A manner of triggering a VM to exit an editing state of an application is not limited in this application. In the following example, a triggering manner is provided, and is implemented by using a procedure shown in FIG. 5. The procedure shown in FIG. 5 includes step S51, step S52, step S53, step S54, and step S55.

Figure 5:
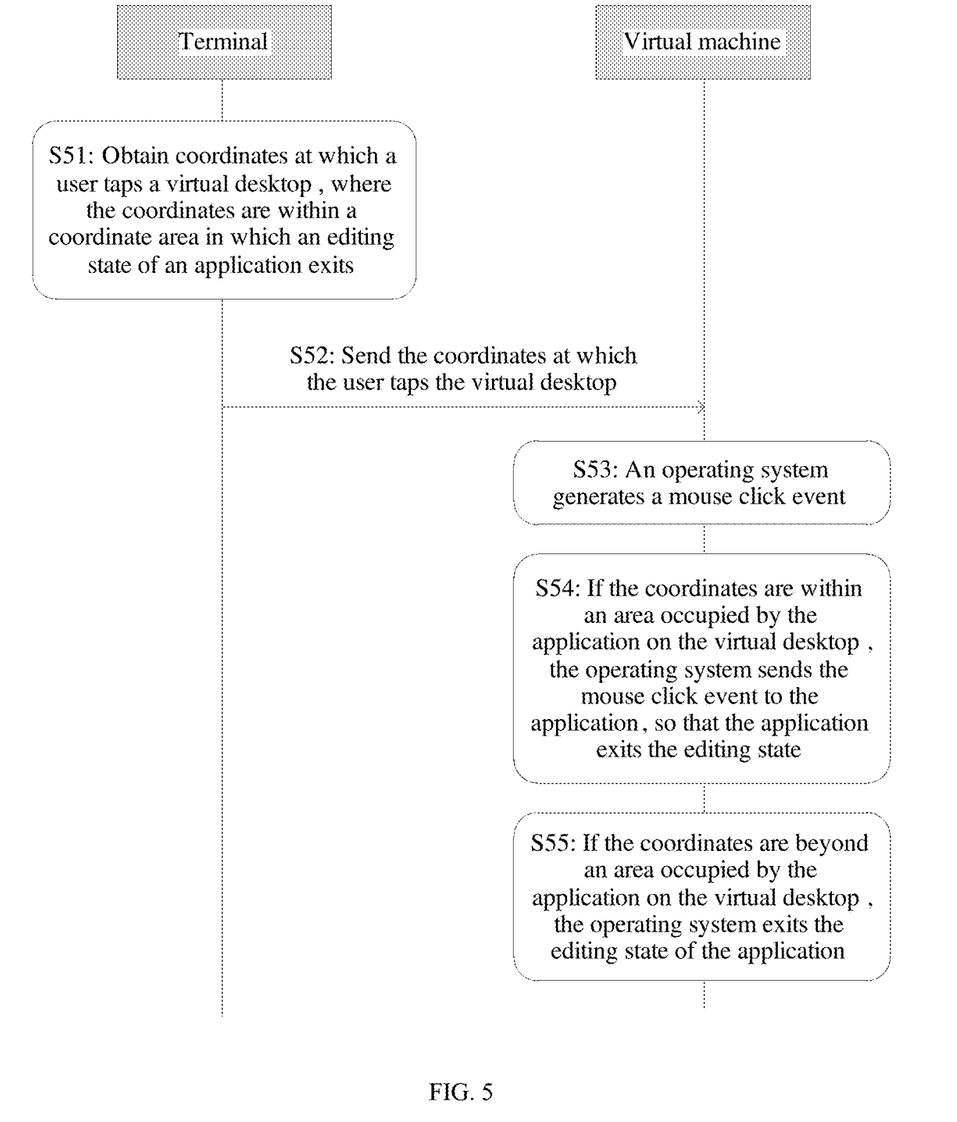
FIG. 5 is a schematic flowchart of triggering an application to exit an editing state.

Step S51: A terminal obtains coordinates at which a user taps a virtual desktop.

The user operates a touchscreen of the terminal, and taps, on the virtual desktop, a coordinate area in which an editing state of the application exits. For example, when the application is in the editing state, the user taps, on the virtual desktop, a control that triggers the application to exit the editing state. An area occupied by the control on the virtual desktop may be the coordinate area in which the application is triggered to exit the editing state. For another example, the user taps another application or area that is not in an editing state on the virtual desktop. An area occupied by the another application on the virtual desktop or the area that is not in the editing state may be the coordinate area in which the editing state of the application exits.

In this way, the terminal may obtain the coordinates at which the user taps the virtual desktop. The coordinates are coordinates in a coordinate system of the virtual desktop, and the coordinates are within the coordinate area in which the editing state of the application exits.

Step S52: The terminal sends the coordinates at which the user taps the virtual desktop to a VM.

Step S53: When the VM receives the coordinates sent by the terminal, an OS of the VM generates a mouse click event, where the mouse click event records the coordinates.

Optionally, when the user taps the virtual desktop, the terminal generates a tap event, and the tap event includes the coordinates at which the user taps the virtual desktop. In step S52, the terminal sends the tap event to the VM. Correspondingly, in step S53, the VM converts the tap event into the mouse click event.

Step S54: If the coordinates at which the user taps the virtual desktop are within an area occupied by the application on the virtual desktop, the OS of the VM sends the mouse click event to the application, where the coordinates recorded in the mouse click event trigger the application to exit the editing state.

Step S55: If the coordinates at which the user taps the virtual desktop are beyond an area occupied by the application on the virtual desktop, the OS of the VM exits the editing state of the application based on the mouse click event. For example, if the coordinates at which the user taps the virtual desktop are within a window of another application, the OS displays the window of the another application.

This application provides an apparatus for invoking an input method. The apparatus is deployed on a server in this application. The apparatus includes functional units used by the server to implement the foregoing method for invoking an input method. In this application, how to divide the apparatus into the functional units is not limited. In the following example, a manner of obtaining the functional units through division is provided, as shown in FIG. 6.

Figure 6:
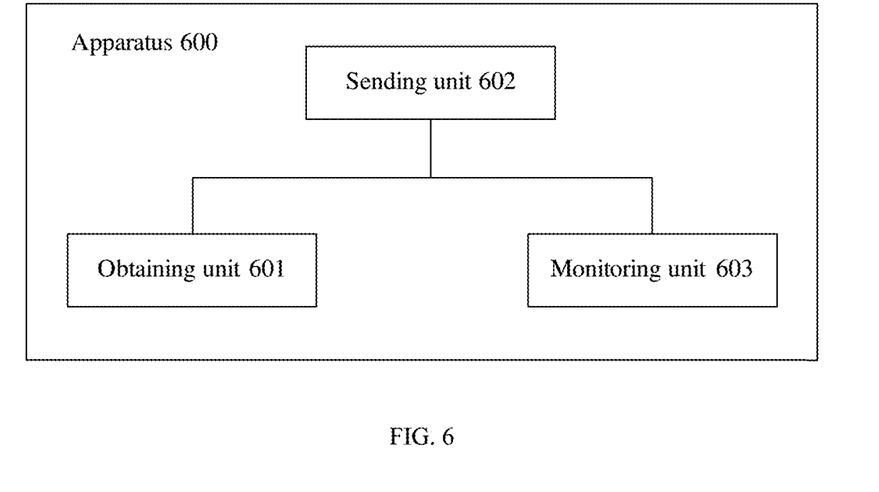
FIG. 6 is a schematic diagram of a logical structure of an apparatus 600 for invoking an input method according to this application.

An apparatus 600 for invoking an input method shown in FIG. 6 includes: an obtaining unit 601 configured to obtain a picture of a virtual desktop provided by a server; a sending unit 602 configured to send the picture of the virtual desktop to a terminal; and a monitoring unit 603 configured to monitor an operating system to determine that an application is in an editing state, where the sending unit 602 is configured to: when the application is in the editing state, send, to the terminal, a message indicating that the application is in the editing state.

Optionally, the obtaining unit 601 is configured to obtain coordinates of a cursor on the virtual desktop; and the sending unit 602 is configured to send the coordinates to the terminal.

Optionally, the monitoring unit 603 is configured to monitor the operating system to determine that the virtual desktop is not in the editing state of the application; and the sending unit 602 is configured to: when the virtual desktop is not in the editing state of the application, send, to the terminal, a message indicating that the virtual desktop is not in the editing state of the application.

This application further provides an apparatus for invoking an input method. The apparatus is deployed on a terminal in this application. The apparatus includes functional units used by the terminal to implement the foregoing method for invoking an input method. In this application, how to divide the apparatus into the functional units is not limited. In the following example, a manner of obtaining the functional units through division is provided, as shown in FIG. 7.

Figure 7:
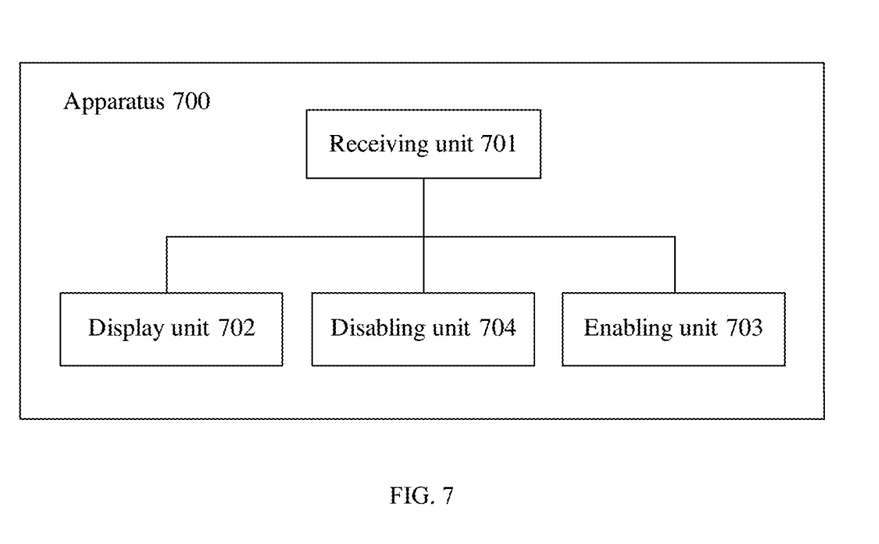
FIG. 7 is a schematic diagram of a logical structure of an apparatus 700 for invoking an input method according to this application.

An apparatus 700 for invoking an input method shown in FIG. 7 includes: a receiving unit 701 configured to receive a picture of a virtual desktop that is sent by a server; a display unit 702 configured to display the picture of the virtual desktop on a display of a terminal, where the receiving unit 701 is configured to receive a message that is sent by the server and that indicates that an application is in an editing state; and an enabling unit 703 configured to enable an input method of the terminal, where the input method of the terminal provides a text input capability for the application that is in the editing state.

Optionally, the display unit 702 is configured to: if there is an overlapping area between a display area of the input method of the terminal and a display area of the virtual desktop on the display, display the input method of the terminal in the overlapping area.

Optionally, the receiving unit 701 is configured to receive coordinates, on the virtual desktop, of a cursor existing when the application is in the editing state; and the display unit 702 is configured to: if the coordinates are within the display area of the input method of the terminal, move the display area of the virtual desktop, so that the coordinates and the display area of the virtual desktop are outside the display area of the input method of the terminal.

Optionally, the receiving unit 701 is configured to receive a message that is sent by the server and that indicates that the virtual desktop is not in the editing state of the application; and a disabling unit 704 is configured to disable the input method of the terminal.

Figure 8:
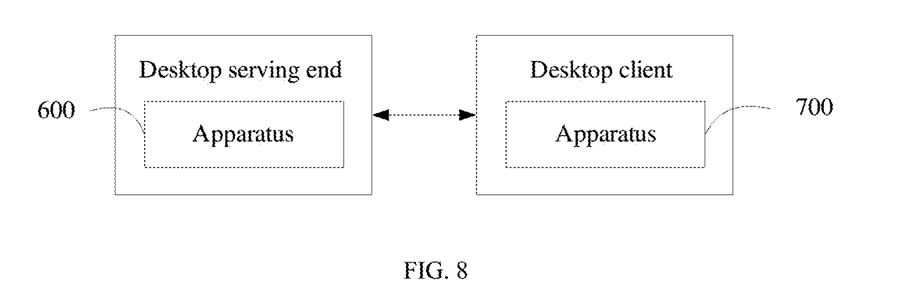
FIG. 8 is a schematic deployment diagram of deploying an apparatus 600 and an apparatus 700.

Referring to FIG. 1 and FIG. 8, a desktop serving end is deployed on a server 200. For example, a program of the desktop serving end is directly executed on the server 200. For example, a VM is deployed on the server 200, and a program of the desktop serving end is executed on the VM.

A desktop client is deployed in a terminal 100. For example, a program of the desktop client is executed on the terminal 100.

The desktop serving end and the desktop client are respectively deployed on the server 200 and the terminal 100 according to a desktop cloud protocol. Optionally, the desktop cloud protocol may be a remote display protocol (RDP), a Citrix Independent Computing Architecture (ICA)) protocol, a high-definition experience (HDE) protocol, a personal computer over Internet Protocol (PC-over-IP) protocol, a simple protocol for independent computing environments (SPICE) protocol, or another protocol used to implement redirection of a virtual desktop.

In this application, the apparatus 600 for invoking an input method may be deployed on the desktop serving end. In this application, the apparatus 700 for invoking an input method may be deployed on the desktop client. In this way, after a user logs in to a virtual desktop by using the desktop client and the desktop serving end, the apparatus 600 and the apparatus 700 may start to work.

Referring to FIG. 1, this application provides a server 200. The server 200 includes a processor 201 and a memory 202.

The memory 202 is configured to store a computer instruction.

The processor 201 is configured to execute the computer instruction stored in the memory 202, so that a desktop serving end run by the server 200 performs the following steps: obtaining a picture of a virtual desktop provided by the server 200, and sending the picture of the virtual desktop to a terminal 100; monitoring an operating system to determine that an application is in an editing state; and when the application is in the editing state, sending, to the terminal 100, a message indicating that the application is in the editing state.

Optionally, the computer instruction instructs the desktop serving end to perform the following steps: obtaining coordinates of a cursor on the virtual desktop; and sending the coordinates to the terminal 100.

Optionally, the computer instruction instructs the desktop serving end to perform the following steps: monitoring the operating system to determine that the virtual desktop is not in the editing state of the application; and when the virtual desktop is not in the editing state of the application, sending, to the terminal 100, a message indicating that the virtual desktop is not in the editing state of the application.

Figure 9:
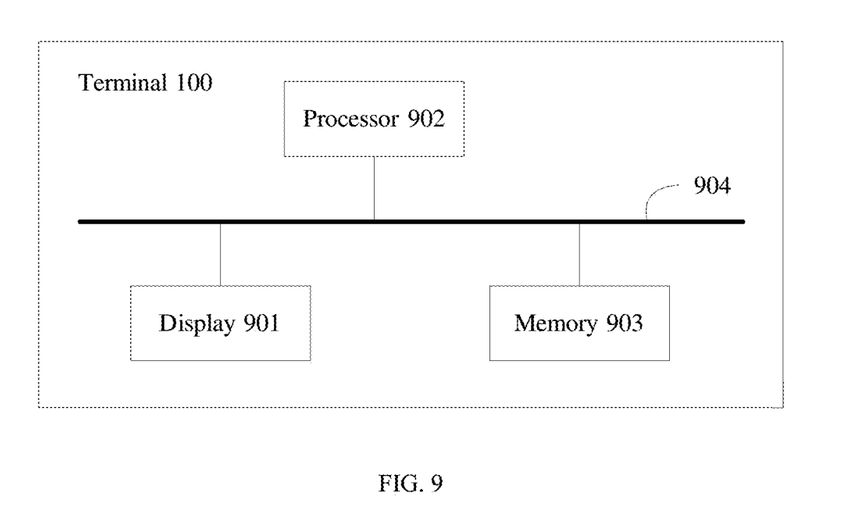
FIG. 9 is a schematic structural diagram of a terminal 100 according to this application.

With reference to FIG. 1 and FIG. 9, this application provides a terminal 100, including a display 901, a processor 902, and a memory 903. Data may be transmitted among the display 901, the processor 902, and the memory 903 by using a bus 904. Optionally, the display 901 may be a touchscreen 101.

The memory 903 is configured to store a computer instruction.

The processor 902 is configured to execute the computer instruction stored in the memory 903, so that the terminal 100 performs the following steps: receiving a picture of a virtual desktop that is sent by the server 200, and displaying the picture of the virtual desktop on the display 901; and receiving a message that is sent by the server 200 and that indicates that an application is in an editing state, and enabling an input method of the terminal 100, where the input method of the terminal 100 provides a text input capability for the application that is in the editing state.

Optionally, the computer instruction instructs the terminal 100 to perform the following step: if there is an overlapping area between a display area of the input method of the terminal 100 and a display area of the virtual desktop on the display 901, displaying the input method of the terminal 100 in the overlapping area.

Optionally, the computer instruction instructs the terminal 100 to perform the following steps: receiving coordinates, on the virtual desktop, of a cursor existing when the application is in the editing state; and if the coordinates are within the display area of the input method of the terminal 100, moving the display area of the virtual desktop, so that the coordinates and the display area of the virtual desktop are outside the display area of the input method of the terminal 100.

Optionally, the computer instruction instructs the terminal 100 to perform the following steps: receiving a message that is sent by the server 200 and that indicates that the virtual desktop is not in the editing state of the application; and disabling the input method of the terminal 100.

This application provides a computer readable storage medium. The computer readable storage medium stores a computer instruction. When a processor 201 in a server 200 executes the computer instruction, the server 200 performs the steps performed by the desktop serving end in the foregoing method for invoking an input method.

This application provides a computer readable storage medium. The computer readable storage medium stores a computer instruction. When a processor 902 in a terminal 100 executes the computer instruction, the terminal 100 performs the steps performed by the terminal 100 in the foregoing method for invoking an input method.

This application provides a computer program product. The computer program product includes a computer instruction. The computer instruction is stored in a computer readable storage medium. A processor 201 in a server 200 may read the computer instruction from the computer readable storage medium, and the processor 201 executes the computer instruction, so that the server 200 performs the steps performed by the desktop serving end in the foregoing method for invoking an input method.

This application provides a computer program product. The computer program product includes a computer instruction. The computer instruction is stored in a computer readable storage medium. A processor 902 in a terminal 100 may read the computer instruction from the computer readable storage medium, and the processor 902 executes the computer instruction, so that the terminal 100 performs the steps performed by the terminal in the foregoing method for invoking an input method.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments, without departing from the protection scope of the claims.

What is claimed is:

1. A method for invoking an input method of a terminal, implemented by a desktop serving end, and comprising:
   obtaining a picture of a virtual desktop;
   sending the picture to the terminal;
   monitoring an operating system to determine whether an application is in an editing state;
   sending a first message to the terminal when the application is in the editing state, wherein the first message indicates that the application is in the editing state, wherein the first message is configured to invoke the input method, and wherein the input method provides a text input capability for the application; and
   obtaining coordinates of a cursor on the virtual desktop.

2. The method of claim 1, further comprising monitoring the operating system to determine whether the virtual desktop is in the editing state.

3. A method for invoking an input method of a terminal, implemented by the terminal, and comprising:
   receiving a picture of a virtual desktop from a server;
   displaying the picture on a display of the terminal;
   receiving a first message from the server, wherein the first message indicates that an application is in an editing state;
   enabling the input method in response to the first message, wherein the input method provides a text input capability for the application; and
   displaying the input method in an overlapping area between a first display area of the input method and a second display area of the virtual desktop.

4. The method of claim 3, further comprising receiving, on the virtual desktop, coordinates of a cursor existing when the application is in the editing state.

5. The method of claim 3, further comprising receiving a second message from the server, wherein the second message indicates that the virtual desktop is not in the editing state.

6. A server comprising:
   a memory configured to store instructions; and
   a processor coupled to the memory and configured to execute the instructions to:
     obtain a picture of a virtual desktop;
     send the picture to a terminal;
     monitor an operating system to determine whether an application is in an editing state;
     send a first message to the terminal when the application is in the editing state, wherein the first message indicates that the application is in the editing state, wherein the first message is configured to invoke an input method of the terminal, and wherein the input method provides a text input capability for the application; and
     obtain coordinates of a cursor on the virtual desktop.

7. The server of claim 6, wherein the processor is further configured to send the coordinates to the terminal.

8. The server of claim 6, wherein the processor is further configured to:
monitor the operating system to determine whether the virtual desktop is in the editing state; and
send a second message to the terminal when the virtual desktop is not in the editing state,
wherein the second message indicates that the virtual desktop is not in the editing state.

9. A terminal comprising:
a display; and
a processor coupled to the display and configured to:
receive a picture of a virtual desktop from a server;
display the picture on the display;
receive a first message from the server, wherein the first message indicates that an application is in an editing state;
enable an input method in response to the first message, wherein the input method provides a text input capability for the application; and
display the input method in an overlapping area between a first display area of the input method and a second display area of the virtual desktop.

10. The terminal of claim 9, wherein the processor is further configured to receive, on the virtual desktop, coordinates of a cursor existing when the application is in the editing state.

11. The terminal of claim 9, wherein the processor is further configured to receive a second message from the server, wherein the second message indicates that the virtual desktop is not in the editing state.

12. The terminal of claim 11, wherein the processor is further configured to disable the input method in response to the second message.

13. The terminal of claim 10, wherein when the coordinates are within the first display area, the processor is further configured to move the second display area so that the coordinates and the second display area are outside the first display area.

14. The method of claim 1, further comprising sending the coordinates to the terminal.

15. The method of claim 2, further comprising sending a second message to the terminal when the virtual desktop is not in the editing state, wherein the second message indicates that the virtual desktop is not in the editing state.

16. The method of claim 4, wherein when the coordinates are within the first display area, the method further comprises moving the second display area so that the coordinates and the second display area are outside the first display area.

17. The method of claim 5, further comprising disabling the input method in response to the second message.

18. The method of claim 1, wherein the input method further provides a voice input capability for the application, and wherein the voice input capability is configured to obtain a voice of a user.

19. The method of claim 3, wherein the input method further provides a voice input capability for the application, and wherein the voice input capability is configured to obtain a voice of a user.

20. The server of claim 6, wherein the input method further provides a voice input capability for the application, and wherein the voice input capability is configured to obtain a voice of a user.

21. The terminal of claim 9, wherein the input method further provides a voice input capability for the application, and wherein the voice input capability is configured to obtain a voice of a user.

* * * * *